United States Patent
Matsui (10) Patent No.: US 10,939,014 B2
(45) Date of Patent: Mar. 2, 2021

(54) IMAGE FORMING APPARATUS THAT PERFORMS A PLURALITY OF FUNCTIONS USING SHARED AND EXCLUSIVE STORAGE AREAS

(71) Applicant: CANON KABUSHIKI KAISHA, Tokyo (JP)

(72) Inventor: Kenta Matsui, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/516,050

(22) Filed: Jul. 18, 2019

(65) Prior Publication Data
US 2020/0036858 A1 Jan. 30, 2020

(30) Foreign Application Priority Data
Jul. 24, 2018 (JP) .............................. JP2018-138459

(51) Int. Cl.
*H04N 1/00* (2006.01)
*H04N 1/32* (2006.01)
(52) U.S. Cl.
CPC ....... *H04N 1/32561* (2013.01); *H04N 1/0097* (2013.01); *H04N 1/32448* (2013.01); *H04N 2201/0094* (2013.01)
(58) Field of Classification Search
CPC ................................................ H04N 1/32448
See application file for complete search history.

(56) References Cited

U.S. PATENT DOCUMENTS

| | | | | |
|---|---|---|---|---|
| 2006/0036800 A1* | 2/2006 | Shiota | ................. | G06F 9/30189 711/100 |
| 2007/0047015 A1* | 3/2007 | Yamada | ............. | H04N 1/00435 358/404 |
| 2009/0244610 A1* | 10/2009 | Mizutani | ................ | G06K 15/02 358/1.15 |
| 2015/0134892 A1* | 5/2015 | Goda | ....................... | H04N 1/21 711/103 |
| 2016/0195916 A1* | 7/2016 | Shiozaki | ............... | G06F 1/1601 348/333.13 |

FOREIGN PATENT DOCUMENTS

JP 11-331529 A 11/1999

* cited by examiner

*Primary Examiner* — Benjamin O Dulaney
(74) *Attorney, Agent, or Firm* — Canon U.S.A., Inc., IP Division (57) ABSTRACT

An image forming apparatus having a plurality of functions includes a storage unit including a storage area divided into a shared area to be used by a plurality of functions and exclusive areas each to be used by one function. In a case where writing into or reading from the storage unit is necessary in a course of PDL processing, a determination is made whether the shared area or a page description language (PDL) exclusive area is to be used.

17 Claims, 6 Drawing Sheets

IMAGE FORMING APPARATUS THAT PERFORMS A PLURALITY OF FUNCTIONS USING SHARED AND EXCLUSIVE STORAGE AREAS

BACKGROUND

Field

The present disclosure relates to an image forming apparatus having a plurality of functions such as page description language (PDL) processing.

Description of the Related Art

There has been known an image forming apparatus that includes a plurality of functions such as a PDL function and a scanning function and uses a storage device such as a hard disk drive (HDD) when performing the functions.

For example, Japanese Patent Application Laid-Open NO. H11-331529 discusses an image processing apparatus including a storage device having a shared area to be shared by the functions and exclusive areas to be used exclusively by the respective functions.

SUMMARY

According to an aspect of the disclosure, an image forming apparatus having a plurality of functions is provided. The image forming apparatus includes a storage unit including a storage area divided into a shared area to be used in processing of the plurality of functions and a plurality of exclusive areas each to be used in processing of one function, and a first control unit configured to control first processing of a first function. The first control unit selects either the shared area or a first exclusive area and uses the selected area in a case where writing into or reading from the storage unit is performed in a course of the first processing.

Further features will become apparent from the following description of exemplary embodiments with reference to the attached drawings.

DESCRIPTION OF THE EMBODIMENTS

Exemplary embodiments will be described below with reference to the drawings.

Figure 1A:
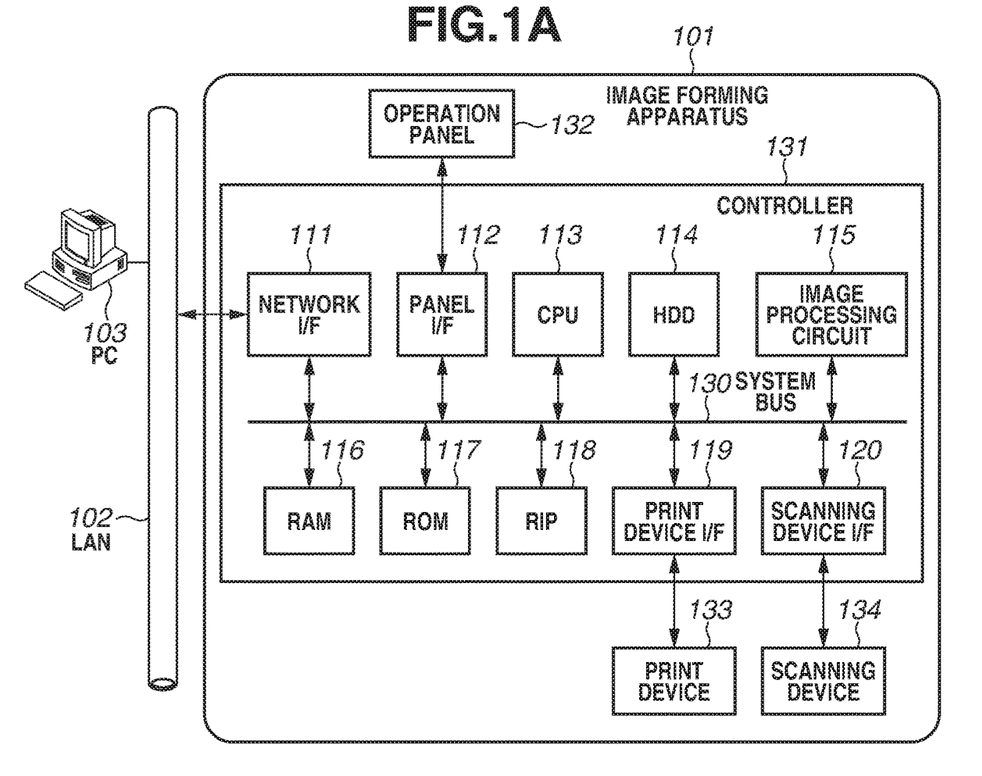
FIGS. 1A and 1B are block diagrams illustrating a hardware configuration and a software configuration, respectively, of an image forming apparatus.

FIG. 1A is a diagram illustrating an example of a hardware configuration of a print system including an image forming apparatus.

An image forming apparatus 101 is a multi-function printer (MFP) having a page description language (PDL) function and a scanning function.

The image forming apparatus 101 is connected to a host computer (personal computer (PC)) 103 via a local area network (LAN) 102 such as Ethernet®. The image forming apparatus 101 can receive PDL data transmitted from the host computer 103 and can execute PDL processing (PDL function). The image forming apparatus 101 can also execute scan processing based on an instruction from an operation panel 132 (scanning function).

The image forming apparatus 101 includes the operation panel 132, a print device 133, a scanning device 134, and a controller 131. These devices will be described below.

The operation panel 132 displays, on the operation panel 132, operation screen data to be received from the controller 131. The operation panel 132 receives an operation instruction from a user and notifies the controller 131 of the instruction as operation information.

The print device 133 executes print processing in which image data is printed on an output sheet based on an instruction from the controller 131.

The scanning device 134 executes scan processing in which image data is generated from an input sheet based on an instruction from the controller 131.

The controller 131 controls the entire image forming apparatus 101 using a program stored in a read only memory (ROM) 117.

The controller 131 includes hardware such as a network interface (I/F) 111, a panel I/F 112, a central processing unit (CPU) 113, a hard disk drive (HDD) 114, and an image processing circuit 115. The controller 131 further includes hardware such as a random access memory (RAM) 116, the ROM 117, a raster image processor (RIP) 118, a print device I/F 119, and a scanning device I/F 120. The hardware is connected to a system bus 130.

The network I/F 111 is an interface implemented by using, for example, a LAN card and through which information is input into and output from an external apparatus such as the PC 103 connected to the LAN 102.

The panel I/F 112 is an interface with the operation panel 132, and through which operation screen data is output to the operation panel 132. The operation panel 132 has a display screen on which various menus and job information about the PDL processing and the scan processing can be displayed.

The panel I/F 112 transmits the operation information input by a user on the operation panel 132 to the CPU 113.

The CPU 113 is a central processor that controls the entire image forming apparatus 101.

The HDD 114 is a storage device. The HDD 114 stores system software necessary for executing various processing in the image forming apparatus 101 and a resource file such as font information and profile information necessary for processing the PDL data.

The image processing circuit 115 executes processing such as correction and resolution conversion on image data generated through the PDL processing and the scan processing so as to correspond to the print device 133 and the scanning device 134.

The RAM 116 is a system work memory used by the CPU 113 to execute an operation. The RAM 116 is also used by the image forming apparatus 101 to receive the PDL data.

The ROM 117 is a boot ROM that stores a boot program of the system. The raster image processor (RIP) 118 inputs intermediate data generated by analyzing the PDL data and outputs image data for printing.

The print device I/F 119 is an interface through which the print device 133 is connected with the controller 131, in the print processing, the print device I/F 119 plays a role of transmitting image data generated by the controller 131 to the print device 133.

The scanning device I/F 120 is an interface through which the scanning device 134 is connected with the controller 131. In the scan processing to be executed by the image forming apparatus 101, the scanning device I/F 120 plays a role of transmitting image data generated by the scanning device 134 to the controller 131.

Figure 1B:
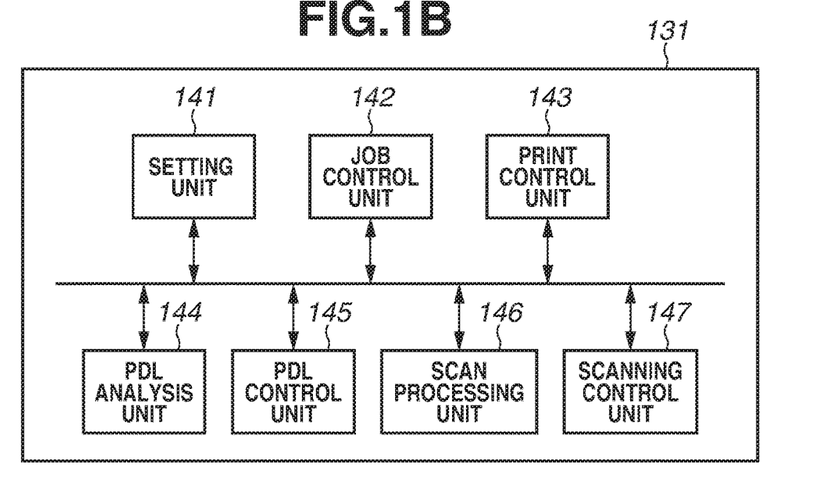

FIG. 1B is a block diagram illustrating an example of a software configuration of the controller 131 that controls an operation of the image forming apparatus 101.

The controller 131 includes various function units such as a setting unit 141, a job control unit 142, a print control unit 143, a PDL analysis unit 144, a PDL control unit 145, a scan processing unit 146, and a scanning control unit 147. A function of each of the function units 141 to 147 is implemented by the hardware such as the CPU 113, the RAM 116, and the HDD 114 and the program stored in the ROM 117.

The setting unit 141 controls input to and output from the operation panel 132 via the system bus 130 and the panel I/F 112.

The job control unit 142 acquires PDL data input via the network I/F 111. Then, the job control unit 142 executes a series of the PDL processing using the print control unit 143 and the PDL control unit 145.

In addition, the job control unit 142 executes a series of the scan processing using the scanning control unit 147 and the print control unit 143 based on the operation information input by the user via the panel I/F 112.

The print control unit 143 outputs image data generated by the PDL control unit 145 to the print device 133 via the print device I/F 119.

The print control unit 143 outputs image data generated by the scanning control unit 147 to the print device 133 via the print device I/F 119.

The PDL analysis unit 144 analyzes the PDL data and generates intermediate data to be input into the RIP 118.

The PDL control unit 145 receives a request from the job control unit 142 and generates the intermediate data from the PDL data using the PDL analysis unit 144, which analyzes the PDL data. The PIN, control unit 145 further generates image data for printing using the RIP 118.

The scan processing unit 146 generates image data for scanning based on image data input from the scanning device 134 and the operation information instructed by the user and input via the panel I/F 112.

The scanning control unit 147 receives a request from the job control unit 142 and generates image data for scanning using the scan processing unit 146, which can execute the scan processing.

The image forming apparatus 101 according to the present exemplary embodiment supports the PDL function and the scanning function as described above. The job control unit 142 in the controller 131 controls execution of the PDL processing and the scan processing.

Figure 2:
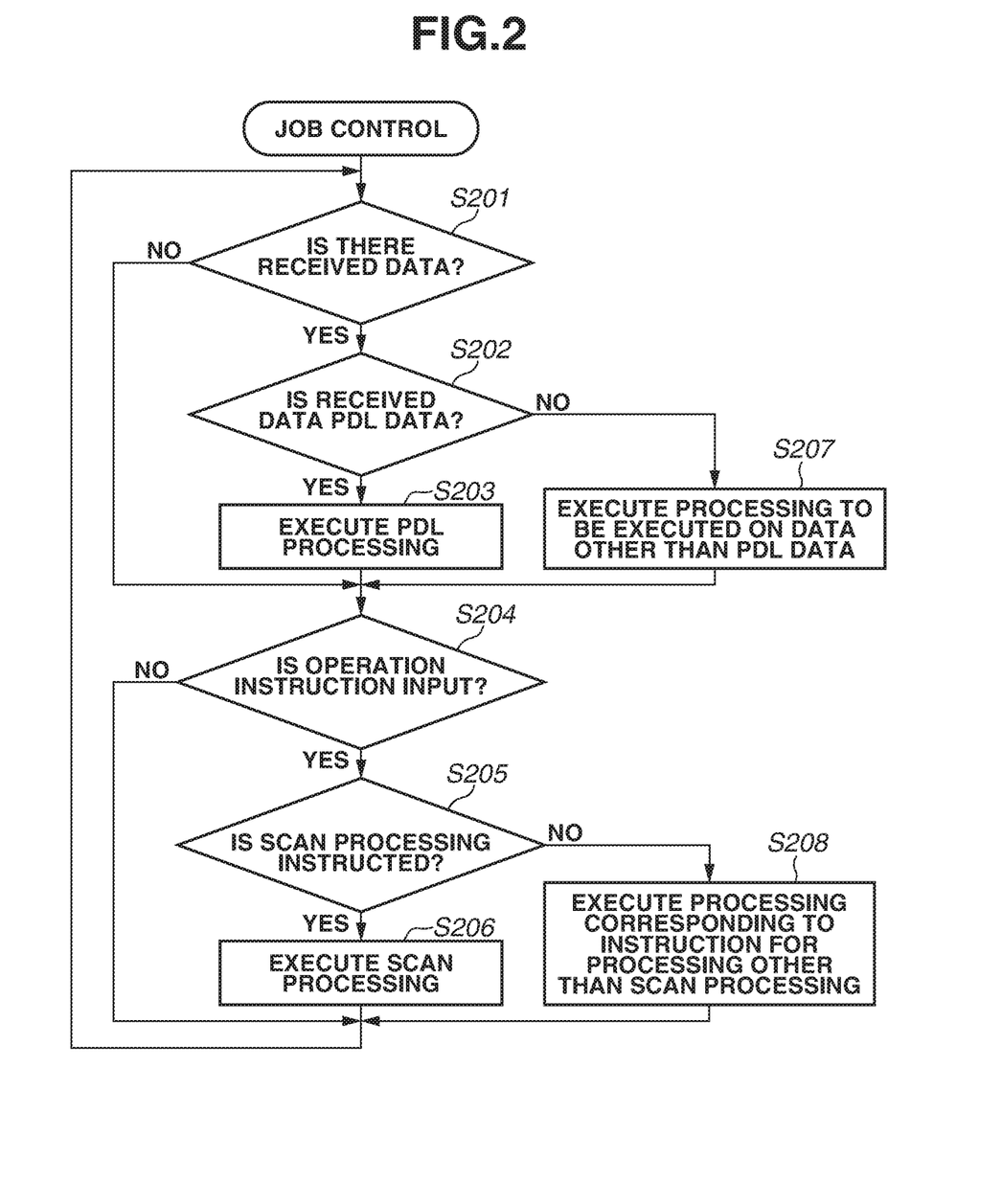
FIG. 2 is a flowchart illustrating job control processing to be executed by a job control unit.

FIG. 2 is a flowchart illustrating processing to be executed by the job control unit 142.

In step S201, the job control unit 142 determines whether there is received data input via the network I/F 111.

If there is the received data (YES in step S201), the processing proceeds to step S202. If there is no received data (NO in step 201), the processing proceeds to step S204.

If there is the received data (YES in step S201), in step S202, the job control unit 142 determines whether the received data is PDL data.

The job control unit 142 can determine whether the received data is the PDL data by checking first ten and several bytes of the received data as described below.

More specifically, in a case where "%/PDF-" is included in the first ten and several bytes of the received data, the data is determined to be PDL data in a format of a portable document format® (PDF®).

In a case where first four bytes of the received data is either "0x04034b50" or "0x504b0304", the data is determined to be PDL data in a format of extensible markup language (XML) paper specification® (XPS®).

In a case where the first four bytes of the received data is "0xCDCA" and a prescribed identifier is present several bytes after the first four bytes, the data is determined to be PDL data in a format of laser beam printer (LBP) image processing system® (LIPS®).

If the received data is the PDL data (YES in step S202), the processing proceeds to step S203. If the received data is not the PDL data (NO in step S202), the processing proceeds to step S207.

If the received data is the PDL data (YES in step S202), in step S203, the job control unit 142 requests the PDL control unit 145 to execute the PDL processing to process the received PDL data.

Details of the PDL processing will be described with reference to FIG. 3.

If the received data is not the PDL data (NO in step S202), in step S207, the job control unit 142 executes processing to be executed on data other than the PDL data.

In step S204, the job control unit 142 checks whether an operation instruction is input via the panel I/F 112.

If the operation instruction is input (YES in step S204), the processing proceeds to step S205. If no operation instruction is input (NO in step S204), the processing returns to step S201.

In step S205, the job control unit 142 determines whether the operation instruction that is input indicates execution of the scan processing.

If the input operation instruction indicates the execution of the scan processing (YES in step S205), the processing proceeds to step S206. If the input operation instruction indicates execution of other processing (NO in step S205), the processing proceeds to step S208.

If the operation instruction indicates the execution of the scan processing (YES in step S205), in step S206, the job control unit 142 requests the scanning control unit 147 to execute the scan processing.

Details of the scan processing will be described with reference to FIG. 4.

If the operation instruction does not indicate the execution of the scan processing (NO in step S205), in step S208, the job control unit 142 executes processing corresponding to an operation instruction for processing other than the scan processing.

Figure 3:
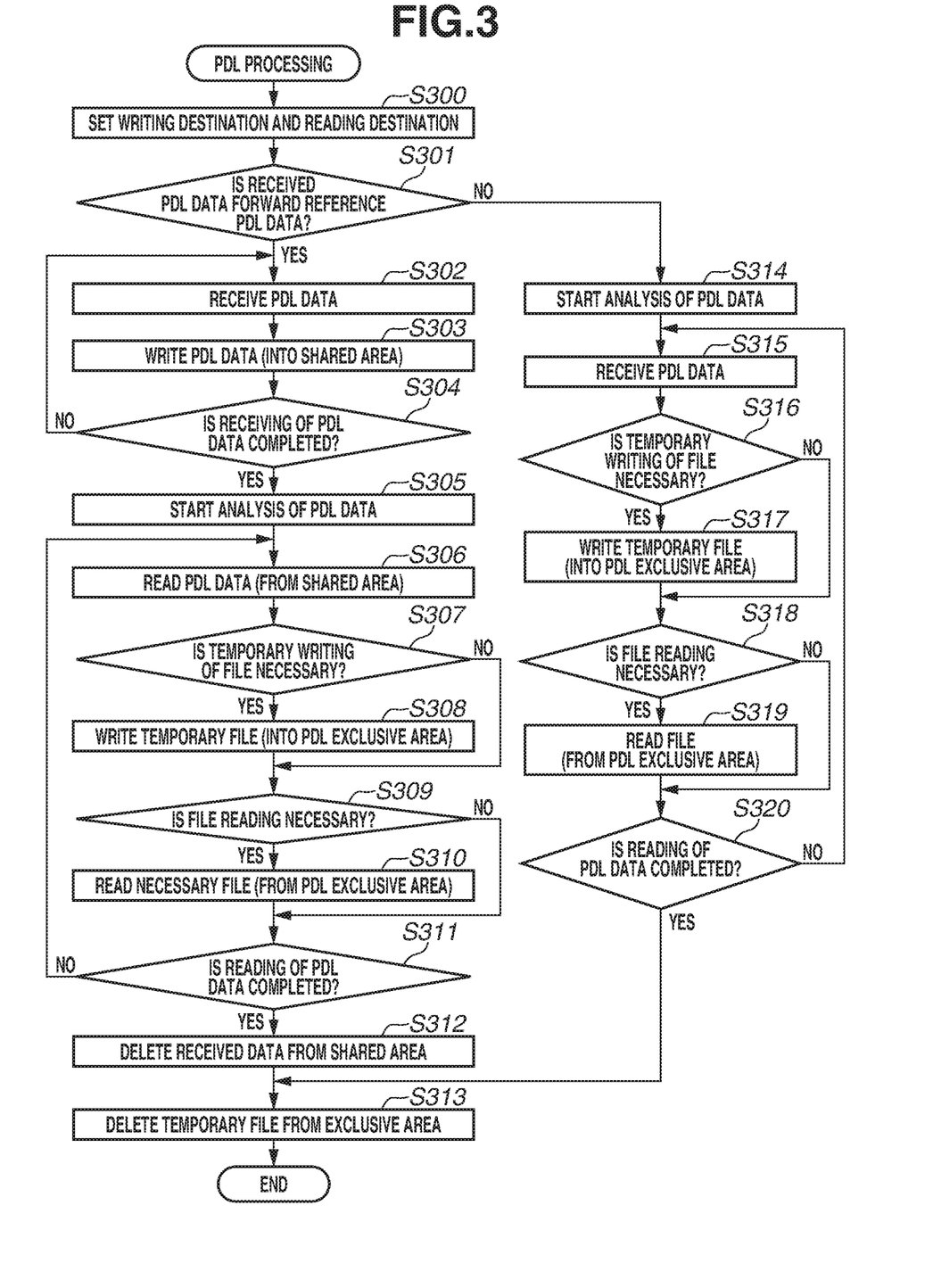
FIG. 3 is a flowchart illustrating page description language (PDL) processing to be executed by a PDL control unit.

FIG. 3 is a flowchart illustrating processing in which the PDL control unit 145 executes the PDL processing that has been requested by the job control unit 142.

Figure 6:
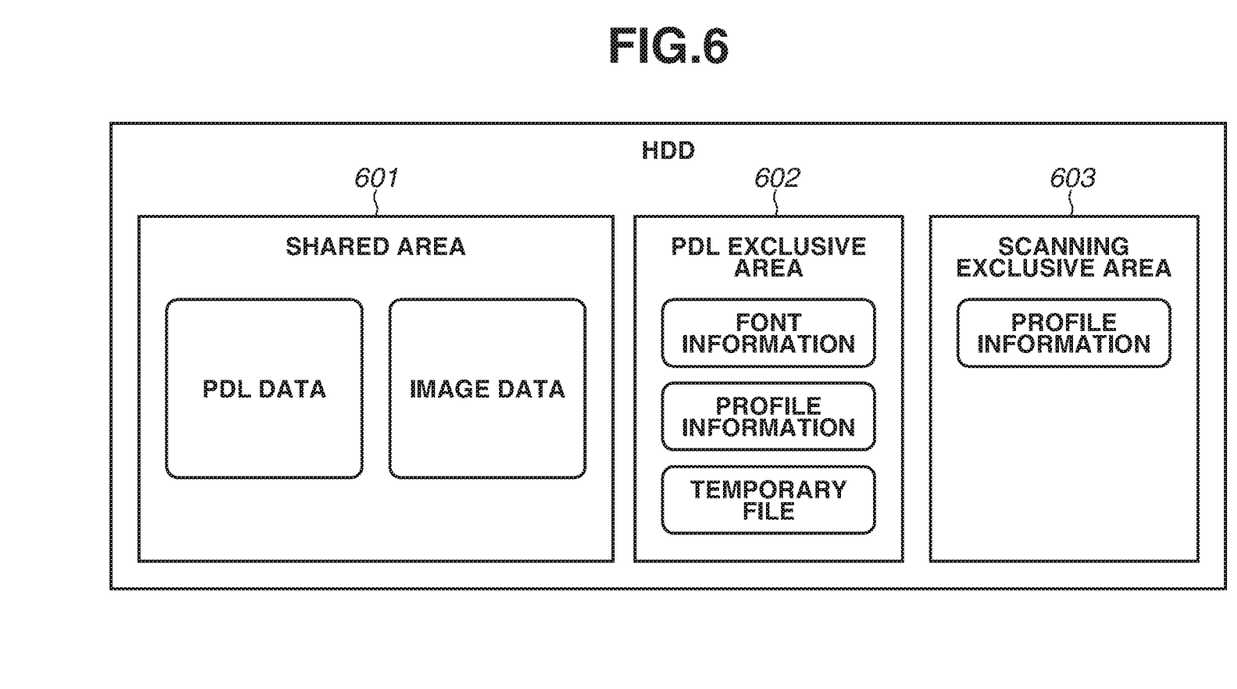
FIG. 6 is a block diagram illustrating a shared area and exclusive areas in a hard disk drive (HDD).

In the present exemplary embodiment, the HDD 114 is divided into a plurality of storage areas (partitions) including a shared area to be used by a plurality of functions and an exclusive area to be used by one function only. More specifically, the HDD 114 is divided into the following storage areas as illustrated in FIG. 6.

(1) Shared area 601: an area to be used in both the PDL processing (step S203) and the scan processing (step S206).
(2) PDL exclusive area 602: an area to be used only in the PDL processing (step S203).
(3) Scanning exclusive area 603: an area to be used only in the scan processing (step S206).

In the present exemplary embodiment, information that has a relatively small data size and frequently makes an access to the HDD 114 is stored in the exclusive areas 602 and 603 in the HDD 114. On the other hand, information that has a relatively large data size and infrequently makes an access to the HDD 114 is stored in the shared area 601.

Mores specifically, in the PDL exclusive area 602, the resource file such as the font information and the profile information that are necessary for processing the PDL data is stored in advance. In the scanning exclusive area 603, profile information that is necessary for the scan processing is stored in advance.

A temporary file generated in the course of the PDL processing (step S203) is stored in the PDL exclusive area 602.

On the other hand, the PDL data to be received by the image forming apparatus 101 is stored in the shared area 601 in a case where the PDL data is stored in the HDD 114. Image data to be generated in the scan processing is also stored in the shared area 601.

Management processing of writing into and reading from the shared area 601, which is used simultaneously in the PDL processing and the scan processing in some cases, needs to be rigorously executed, and thus a load of the management processing is large.

On the other hand, the management processing of writing into and reading from the PDL exclusive area 602, which is used only in the PDL processing, is simple, and thus the load of the management processing is small. For this reason, in execution of the PDL processing, performance can be improved by using the PDL exclusive area 602.

Referring back to the flowchart in FIG. 3, in step S300, the PDL control unit 145 selects either the shared area 601 or the PDL exclusive area 602 based on a type of information such as data and a file to be written or read and uses the selected area in the course of the PDL processing. More specifically, in the present exemplary embodiment, selection is made as follows.

The shared area 601 is used for writing and reading PDL data to be received.

The PDL exclusive area 602 is used for writing and reading the temporary file generated in the course of the PDL processing.

The PDL exclusive area 602 is used for reading the resource file (e.g., font information and profile information) necessary in the course of the PDL processing.

In step S301, the PDL control unit 145 determines whether the received PDL data is forward reference PDL data or backward reference PDL data.

If the received PDL data is the forward reference PDL data (YES in step S301), the processing proceeds to step S302. On the other hand, if the received data is backward reference PDL data (NO in step S301), the processing proceeds to step S314.

Figure 5A:
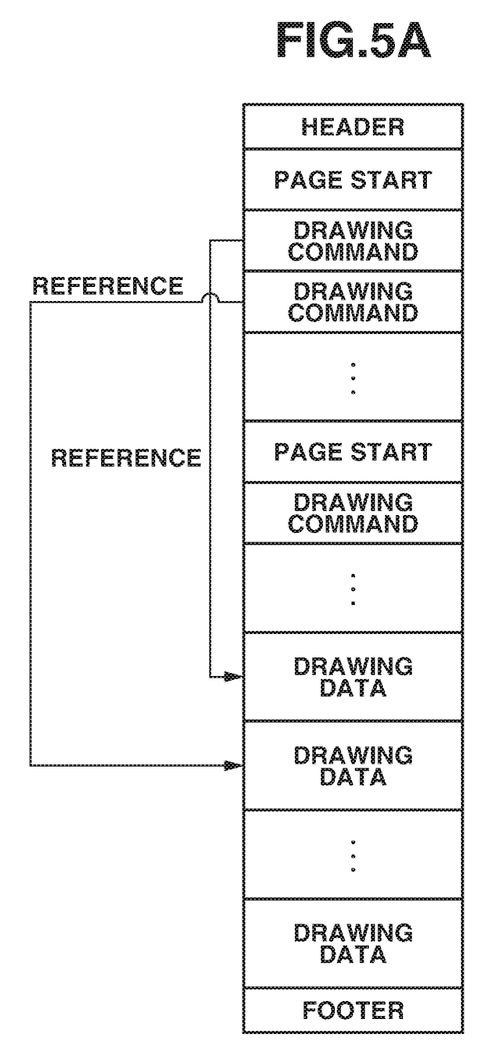
FIGS. 5A and 5B are diagrams illustrating data configurations of forward reference PDL data and backward reference PDL data, respectively.
Figure 5B:
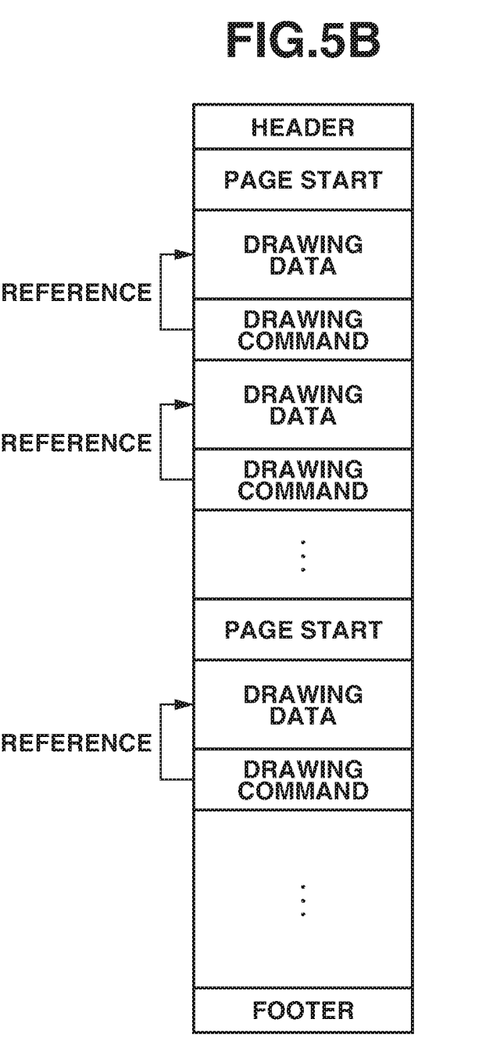

Herein, the PDL data is divided into two types of data, the forward reference PDL data and the backward reference PDL data, depending on data configurations as illustrated in FIGS. 5A and 5B.

FIG. 5A illustrates an example of the forward reference PDL data.

If the received data is the forward reference PDL data, as illustrated in FIG. 5A, drawing data that has not been received yet is referred to. Thus, even if processing of the received data is to be started, drawing data to be processed may not be received yet in some cases.

For this reason, in the case where the received PDL data is the forward reference PDL data, it is necessary to first receive all data and then execute the PDL processing rather than processing the data in order of receiving.

On the other hand, FIG. 5B illustrates an example of the backward reference PDL data.

If the received data is the backward reference PDL data, all drawing data to be referred to have already been received. For this reason, the backward reference PDL data can be processed in the order of receiving, and thus the PDL processing can be started simultaneously with the receiving of the data.

In the present exemplary embodiment, the job control unit 142 notifies the PDL control unit 145 of a type of the PDL data (step S202 in the flowchart of FIG. 2).

If the received. PDL data is the PDF or XI'S data, the PDL control unit 145 determines that the received PDL data is the forward reference PDL data. If the received PDL data is the LIPS data, the PDL control unit 145 determines that the received data is the backward reference PDL data.

In step S302, the PDL control unit 145 receives unreceived PDL data.

In step S303, the PDL control unit 145 writes the received PDL data into the HDD 114. At this time, the PDL control unit 145 writes the received PDL, data into the shared area 601 of the HDD 114 based on the setting made in step S300.

In step S304, the PDL control unit 145 checks whether all the PDL data have been received.

If all the PDL data have been received (YES in step S304), the processing proceeds to S305. If there is unreceived data, the processing returns to step S302.

When receiving of the PDL data is completed, in step S305, the PDL control unit 145 requests the PDL analysis unit 144 to start analysis of the PDL data (e.g., forward reference PDL data that is the PDF or XPS data).

Then, in step S306, the PDL analysis unit 144 reads the PDL data (PDL data written in step S303) from the shared area 601 of the HDD 114.

At this time, in the present exemplary embodiment, the PDL analysis unit 144 makes an inquiry of the PDL control unit 145 about a reading destination (i.e., where to read the data from) of the received data. The PDL control unit 145, which has information about the reading destination of the received data, notifies the PDL analysis unit 144 of the shared area 601 as the reading destination of the received data.

In step S307, the PDL analysis unit 144 analyzes the received data and, as a result of the analysis, determines whether temporary writing of a file is necessary.

Depending on the PDL data, the PDL analysis unit 144 may output a temporary file to be used in drawing processing in some cases. In such a case, the PDL analysis unit 144 determines that writing of the file is necessary (YES in step S307), and the processing proceeds to step S308. If writing of the temporary file is not necessary (NO in step S307), the processing proceeds to step S309.

If writing of the temporary file is necessary (YES in step S307), in step S308, the PDL, analysis unit 144 writes the temporary file generated in step S307 into the HDD 114.

In the present exemplary embodiment, the PDL analysis unit 144 makes an inquiry of the PDL control unit 145 about a writing destination (i.e., where to write the data to) of the temporary file. Then, the PDL control unit 145 notifies the PDL analysis unit 144 of the PDL exclusive area 602 as the writing destination of the temporary file based on the setting made in step S300. Then, the PDL analysis unit 144 writes the temporary file into the PDL exclusive area 602 of the HDD 114.

In step S309, the PDL analysis unit 144 analyzes the received data and determines, as a result of the analysis, whether file reading is necessary.

Depending on the PDL data, the PDL analysis unit 144 reads the resource file such as the font information and the profile information stored in the HDD 114 in advance, and uses the file in the drawing processing in some cases. In such a case, reading of the resource file is necessary (YES in step S309), and the processing proceeds to step S310. In other cases (NO in step S309), the processing proceeds to step S311.

If reading of the resource file is necessary (YES in step S309), in step S310, the PDL analysis unit 144 reads a necessary file from the PDL exclusive area 602 of the HDD 114.

In the present exemplary embodiment, the PDL analysis unit 144 makes an inquiry of the PDL control unit 145 about the reading destination. Then, the PDL control unit 145 notifies the PDL analysis unit 144 of the PDL exclusive area 602 as the reading destination of the resource file based on the setting made in step S300. Then, the PDL analysis unit 144 reads the resource file from the PDL, exclusive area 602 of the HDD 114.

In step S311, the PDL analysis unit 144 checks whether reading of the PDL data (PDL data written in step S303) from the shared area 601 of the HDD 114 is completed.

If the reading is completed (YES in step S311), the processing proceeds to step S312. If the reading is not completed (NO in step S311), the processing returns to step S306.

If the reading is completed, in step S312, the PDL control unit 145 deletes the PDL data (PDL data written in step S303) from the shared area 601 of the HDD 114.

In step S313, the PDL analysis unit 144 deletes the temporary file that has been written into the PDL exclusive area 602 of the HDD 114 in step S308. If there is no temporary file that has been written, no processing in particular is performed.

If it is determined in step S301 that the received PDL data is the backward reference PDL data (NO in step S301), in step S314, the PDL control unit 145 requests the PDL analysis unit 144 to start analyzing the PDL data (i.e., the backward reference PDL data that is LIPS data).

In step S315, the PDL analysis unit 144 receives unreceived PDL data.

In step S316, similar to step S307, the PDL analysis unit 144 analyzes the received data and, as a result of the analysis, determines whether temporary writing of a file is necessary.

If temporary writing of the file is necessary (YES in step S316), the processing proceeds to step S317. If temporary writing of the file is not necessary (NO in step S316), the processing proceeds to step S318.

If temporary writing of the file is necessary (YES in step S316), in step S317, the PDL analysis unit 144 writes the temporary file into the PDL exclusive area 602 of the HDD 114.

In the present exemplary embodiment, similar to step S308, the PDL analysis unit 144 makes an inquiry of the PDL control unit 145 about the writing destination of the temporary file. Then, the PDL control unit 145 notifies the PDL analysis unit 144 of the PDL exclusive area 602 as the writing destination.

In step S318, similar to step S309, the PDL analysis unit 144 analyzes the received data and determines, as a result of the analysis, whether file reading is necessary.

If file reading is necessary (YES in step S318), the processing proceeds to step S319. If file reading is not necessary (NO in step S318), the processing proceeds to step S320.

If file reading is necessary (YES in step S318), in step S319, the PDL analysis unit 144 reads a file from the PDL exclusive area 602 of the HDD 114.

In the present exemplary embodiment, similar to step S310, the PDL analysis unit 144 makes an inquiry of the PDL control unit 145 about the reading destination. Then, the PDL control unit 145 notifies the PDL analysis unit 144 of the PDL exclusive area 602 as the reading destination.

In step S320, the PDL analysis unit 144 checks whether reading of the received data is completed.

If reading is completed (YES in step S320), the processing proceeds to step S313. If reading is not completed (NO in step S320), the processing returns to step S315.

Figure 4:
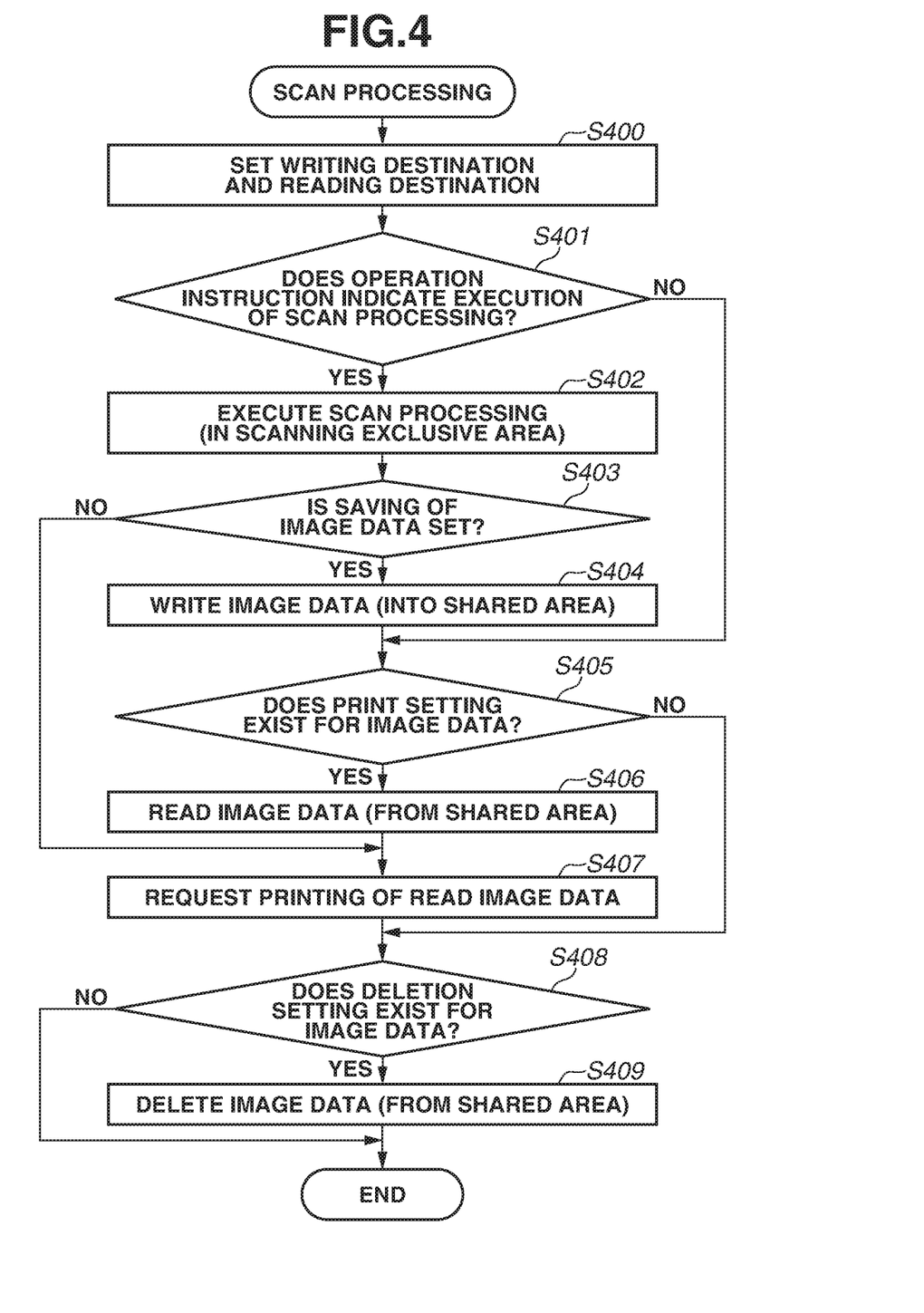
FIG. 4 is a flowchart illustrating scan processing to be executed by a scanning control unit.

FIG. 4 is a flowchart illustrating processing in which the scanning control unit 147 executes the scan processing that has been requested by the job control unit 142.

In step S400, the scanning control unit 147 selects either the shared area 601 or the scanning exclusive area 603 based on a type of information such as data and a file to be written or read and uses the selected area in the course of the scan processing. More specifically, in the present exemplary embodiment, selection is made as follows.

The shared area 601 is used for writing and reading image data to be generated.

The scanning exclusive area 603 is used for reading the profile information necessary in the course of the scan processing.

In step S401, the scanning control unit 147 determines whether the operation instruction input via the panel I/F 112 is execution of the scan processing.

If the operation instruction is the execution of the scan processing (YES in step S401), the processing proceeds to step S402. If the operation instruction is other processing (NC) in step S401), the processing proceeds to step S405.

If the operation instruction is the execution of the scan processing (YES in step S401), in step S402, the scanning control unit 147 notifies the scan processing unit 146 to execute the scan processing.

Then, the scan processing unit 146 generates image data for scanning based on the image data input from the scanning device 134, the operation information instructed by a user via the panel I/F 112, and the profile information for the scan processing.

In the present exemplary embodiment, the scan processing unit 146 makes an inquiry of the scanning control unit 147 about the reading destination of the profile information. Then, the scanning control unit 147 notifies the scan processing unit 146 of the scanning exclusive area 603 as the reading destination of the profile information based on the setting made in step S400. Then, the scan processing unit 146 reads the profile information from the scanning exclusive area 603 of the HDD 114.

In step S403, the scanning control unit 147 makes an inquiry of the setting unit 141 about whether saving of the image data for scanning generated in step S402 is set.

If the saving is set (YES in step S403), the processing proceeds to step S404. If the saving is not set (NO in step S403), the processing proceeds to step S407.

If the saving of the image data for scanning is set, in step S404, the scanning control unit 147 writes the image data generated in step S402 into the shared area 601 of the HDD 114 based on the setting made in step S400.

In step S405, the scanning control unit 147 makes an inquiry of the setting unit 141 about whether a print setting exists for the image data written into the HDD 114 in step S404.

If the print setting exists (YES in step S405), the processing proceeds to step S406. If the print setting does not exist (NO in step S405), the processing proceeds to step S408.

If the print setting exists (YES in step S405), in step S406, the scanning control unit 147 reads the image data having the print setting from the shared area 601 of the HDD 114 based on the setting made in step S400.

In step S407, the scanning control unit 147 requests the print control unit 143 to print the read image data.

In step S408, the scanning control unit 147 makes an inquiry of the setting unit 141 about whether a deletion setting exists for the image data written into the HDD 114 in step S404.

If the deletion setting exists (YES in step S408), the processing proceeds to step S409. If the deletion setting does not exist (NO in step S408), the series of the scan processing is ended.

If the deletion setting exists (YES in step S408), in step S409, the scanning control unit 147 deletes the image data having the deletion setting from the shared area 601 of the HDD 114 based on the setting made in step S400.

Thus, the series of the scan processing is ended.

As described above, in the PDL processing according to the present exemplary embodiment, the shared area 601 of the HDD 114 is used in a case where the PIN, data to be received is to be written into the HDD 114. The PDL exclusive area 602 of the HDD 114 is used in a case where the temporary file is to be written or the resource file is to be read.

In such a manner, by using the shared area 601, which is also used in processing other than the PDL, processing, the PDL function can be provided in an image forming apparatus having a small-capacity HDD.

In addition, by performing the writing and reading into and from the HDD 114 necessary in the PDL analysis processing in the PDL, exclusive area 602, the performance of the PDL processing can be increased compared to a case where all the PDL analysis processing is executed in the shared area 601.

The present invention can also be achieved by processing in which a program that achieves one or more functions according to the above exemplary embodiment is supplied to a system or an apparatus via a network or a storage medium and one or more processors in a computer of the system or the apparatus to read the program and execute the program. The present invention can also be achieved by a circuit (for example, an application-specific integrated circuit (ASIC)) that achieves one or more functions.

The present invention may be applied to a system including a plurality of devices or to an apparatus including one device.

The present invention is not limited to the above-described exemplary embodiment. Various modifications can be made based on the spirit of the present invention, and such modifications are not excluded from the scope of the present invention. In other words, a configuration obtained by combining the above-described embodiments and modifications is also included in the present invention.

Other Embodiments

Embodiment(s) of the disclosure can also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-138459, filed Jul. 24, 2018, which is hereby incorporated by reference herein in its entirety.

What is claimed is:

1. An image forming apparatus configured to perform a plurality of functions including at least a received print function for executing printing based on received page description language (PDL) data, the apparatus comprising:
  a reception interface (I/F) configured to receive the PDL data;
  a nonvolatile storage device having a storage area including a shared area to be used in processing of the plurality of functions and an exclusive area to be used exclusively in processing of the received print function; and
  a controller configured to control PDL processing of the received print function,
  wherein the controller executes the PDL processing using the shared area and the exclusive area based on the fact that the PDL data received by the reception I/F is PDL data of a first type and executes the PDL processing using the exclusive area and not using the shared area based on the fact that the PDL data received by the reception I/F is PDL data of a second type different from the first type.

2. The image forming apparatus according to claim 1, further comprising:
a scanner configured to read a document,
wherein the controller controls scan processing of a document reading function of the scanner, and
wherein, in a case where writing into or reading from the storage device is performed in a course of the scan processing, the controller selects either the shared area or a different exclusive area different from the exclusive area and uses the selected area.

3. The image forming apparatus according to claim 2, wherein the controller selects either the shared area or the different exclusive area and uses the selected area depending on a type of information to be written or read in the course of the scan processing.

4. The image forming apparatus according to claim 2, wherein the controller selects and uses the shared area in a case where information to be written into or read from the storage device in the course of the scan processing is image data.

5. The image forming apparatus according to claim 2, wherein the controller selects and uses the different exclusive area in a case where information to be written into or read from the storage device in the course of the scan processing is a resource file.

6. The image forming apparatus according to claim 5, wherein the resource file is profile information.

7. The image forming apparatus according to claim 1, wherein the controller stores the PDL data of the first type in the shared area based on the fact that the received PDL data is the PDL data of the first type.

8. The image forming apparatus according to claim 7, wherein the controller stores, in the exclusive area, image data generated in a course of PDL processing of the PDL data of the first type stored in the storage device.

9. The image forming apparatus according to claim 1, wherein, in a case where information to be written into or read from the storage device in the course of the PDL processing is a resource file, the controller stores the information in the exclusive area.

10. The image forming apparatus according to claim 9, wherein the resource file is font information and/or profile information.

11. The image forming apparatus according to claim 1, wherein the controller selects and uses the exclusive area in a case where information to be written into or read from the storage device in the course of the PDL processing is a temporary file to be generated in the course of the PDL processing.

12. The image forming apparatus according to claim 1, wherein the image forming apparatus receives drawing data in the PDL data of the first type after receiving a drawing command in the PDL data of the first type.

13. The image forming apparatus according to claim 1, wherein the PDL data of the first type is in a format of PDL or in a format of extensible markup language (XML) paper specification (XPS).

14. The image forming apparatus according to claim 1, wherein the image forming apparatus alternately receives a drawing command in the PDL data of the second type and drawing data in the PDL data of the second type.

15. The image forming apparatus according to claim 1, wherein the PDL data of the second type is in a format of laser beam printer (LBP) image processing system (LIPS).

16. The image forming apparatus according to claim 1, wherein the storage device is a hard disk drive (HDD).

17. A control method for an image forming apparatus, the image forming apparatus configured to perform a plurality of functions including at least a received print function for executing printing based on received page description language (PDL) data, a non-volatile storage device including a shared area to be used in processing of a plurality of functions and an exclusive area to be used exclusively in processing of the received print function, the control method comprising:
receiving the PDL data at a reception interface;
controlling, via a controller, PDL processing of the received print function,
wherein in the controller executes the PDL processing using the shared area and the exclusive area based on the fact that the PDL data received by the reception I/F is PDL data of a first type and executes the PDL processing using the exclusive area and not using the shared area based on the fact that the PDL data received by the reception I/F is PDL data of a second type different from the first type.

* * * * *